LEVI HERMANCE.

Improvement in Cooking-Stoves.

No. 4,428. Reissued June 20, 1871.

Witnesses.

C. L. Ernst.

Jas. E. Hutchinson

Inventor.

Levi Hermance per Alexander Mason

Atty.

AM. PHOTO-LITHOGRAPHIC CO. N.Y. (OSBORNE'S PROCESS.)

UNITED STATES PATENT OFFICE.

LEVI HERMANCE, OF LANSINGBURG, NEW YORK.

IMPROVEMENT IN COOKING-STOVES.

Specification forming part of Letters Patent No. 99,436, dated February 1, 1870; reissue No. 4,428, dated June 20, 1871.

*To all whom it may concern:*

Be it known that I, LEVI HERMANCE, of Lansingburg, in the county of Rensselaer and in the State of New York, have invented certain new and useful Improvements in Water-Reservoirs for Cooking-Stoves; and do hereby declare that the following is a full, clear, and exact description thereof, reference being had to the accompanying drawing and to the letters of reference marked thereon making a part of this specification.

The nature of my invention consists in constructing a dead-air chamber on the outside of the stove for heating water in a reservoir; and it also consists in casting, or otherwise securely attaching to the reservoir, suitably-shaped lugs or flanges, which, when the reservoir is placed in proper position, fit into corresponding recesses or notches cast in the top plate of the stove, thus holding the reservoir in its proper place and position, all of which will be hereinafter more fully set forth.

In order to enable others skilled in the art to which my invention appertains to make and use the same, I will now proceed to describe its construction and operation, referring to the annexed drawing, in which—

Figure 1:
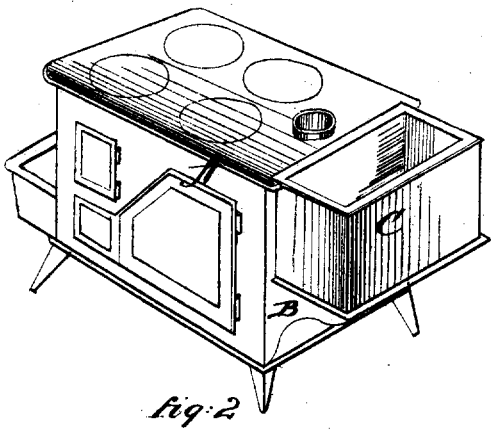
Figure 3:
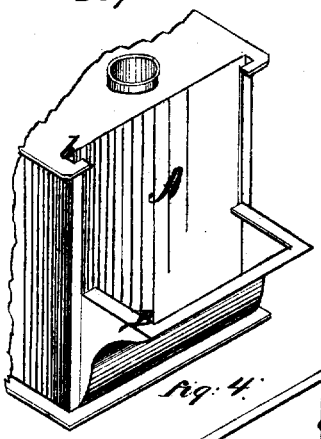
Figure 2:
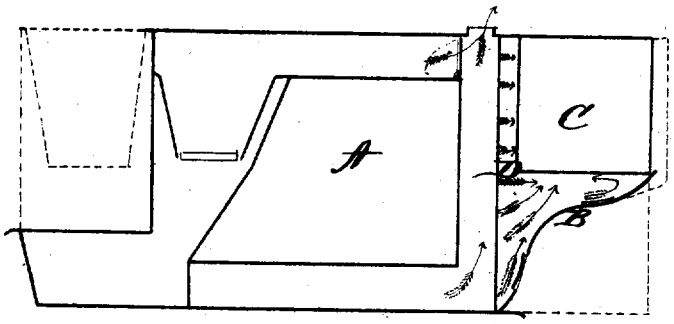
Figure 4:
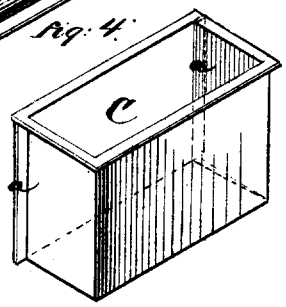

Figure 1 is a perspective view of the entire stove with the water-reservoir attached. Fig. 2 is a longitudinal vertical section of the entire stove, showing the dead-air chamber and the water-reservoir in position. Fig. 3 is a perspective view of the rear part of the stove, showing the place where the water-reservoir is to be placed. Fig. 4 is a perspective view of the water-reservoir.

A represents a cooking-stove, made in any of the known and usual ways. At the rear end of the stove A is placed an extension, B, of any suitable construction, to support the water-reservoir C in any manner desired, so as to form a dead-air chamber, D, underneath and on one or more of the sides of the reservoir, the reservoir being held in place by means that will be hereinafter described. The air in the chamber D, becoming heated, heats the water in the reservoir sufficient for any purpose.

In all stoves where water-reservoirs have heretofore been used, the smoke and heat or products of combustion have invariably been allowed access to the reservoir; but this has been found by experience to be open to a great many objections, which are entirely overcome or obviated by forming a dead-air chamber around the reservoir, and this heated air bringing the water to the desired temperature.

Another advantage is that the reservoir cannot by any possible means be burned out.

The dead-air chamber may extend on all sides of the reservoir, if so desired, and may be placed either in front or rear of the stove, or, in some cases, at the side.

I do not confine myself to any particular position or construction of the said dead-air chamber, only so that it is outside of the stove proper, and is used to heat the water-reservoir.

If necessary, I may supply dampers to expel the heated air and supply cold air, but this I deem of minor importance.

Upon each side of the reservoir C is cast or otherwise attached a lug or flange, *a*, of any suitable size or shape, so as to possess sufficient size and strength to answer the required purpose. These lugs or flanges are inserted in notches or recesses *b b* formed in the top plate of the stove, as shown in Fig. 3. The lugs or flanges *a a*, fitting in said notches or recesses, thus firmly and securely hold the reservoir in its proper place and position.

Having thus fully described my invention, what I claim as new, and desire to secure by Letters Patent, is—

1. In combination with a cooking-stove, a dead-air chamber, formed by an extension of the stove and the water-reservoir, for the purpose of heating the water in the same, substantially as herein set forth.

2. The dead-air chamber D, formed on the outside of a cooking-stove, as described, for the purpose of heating the water in a water-reservoir, substantially as herein set forth.

3. The combination of a stove with the reservoir C and dead-air chamber D, substantially as and for the purposes herein set forth.

4. A reservoir or water-tank attached to a cooking-stove, when said reservoir or tank is placed upon or within a chamber or hot-air space formed outside of the walls of a stove, substantially as herein set forth.

5. Attaching or securing the reservoir C to the rear of a cooking-stove by means of lugs, flanges, or projections *a a* fitting into corresponding notches or recesses *b b* cast in the back part of the top plate of the stove, substantially as herein set forth.

In testimony that I claim the foregoing I have hereunto set my hand this 27th day of April, 1871.

LEVI HERMANCE.

Witnesses:

PELOTUT J. MARSH,

T. H. BRYAN.